US009122713B2

(12) United States Patent
Okamoto

(10) Patent No.: US 9,122,713 B2
(45) Date of Patent: Sep. 1, 2015

(54) DISTRIBUTED DATA MANAGEMENT SYSTEM

(71) Applicant: Pivotal Software, Inc., Palo Alto, CA (US)

(72) Inventor: Russell Okamoto, Beaverton, OR (US)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 13/959,748

(22) Filed: Aug. 6, 2013

(65) Prior Publication Data

US 2014/0195566 A1 Jul. 10, 2014

Related U.S. Application Data

(63) Continuation of application No. 13/083,664, filed on Apr. 11, 2011, now Pat. No. 8,504,521.

(51) Int. Cl.
*G06F 17/00* (2006.01)
*G06F 17/30* (2006.01)

(52) U.S. Cl.
CPC .............. *G06F 17/303* (2013.01); *G06F 17/30* (2013.01)

(58) Field of Classification Search
CPC .................... G06F 17/30212; G06F 17/30215
USPC ..................... 707/626, 704; 718/105
See application file for complete search history.

(56) References Cited

U.S. PATENT DOCUMENTS

| 6,363,396 | B1 * | 3/2002 | Klots et al. ........................ 1/1 |
| 6,757,696 | B2 * | 6/2004 | Multer et al. ..................... 1/1 |
| 2003/0126200 | A1 * | 7/2003 | Wolff ............................ 709/203 |
| 2003/0204517 | A1 * | 10/2003 | Skinner et al. ................ 707/100 |
| 2005/0160413 | A1 * | 7/2005 | Broussard et al. ............ 717/148 |
| 2006/0069761 | A1 | 3/2006 | Singh et al. |

* cited by examiner

*Primary Examiner* — Cam-Y Truong
(74) *Attorney, Agent, or Firm* — Fish & Richardson P.C.

(57) ABSTRACT

A distributed data management system has multiple virtual machine nodes operating on multiple computers that are in communication with each other over a computer network. Each virtual machine node includes at least one data store or "bucket" for receiving data. A digital hash map data structure is stored in a computer readable medium of at least one of the multiple computers to configure the multiple virtual machine nodes and buckets to provide concurrent, non-blocking access to data in the buckets, the digital hash map data structure including a mapping between the virtual machine nodes and the buckets. The distributed data management system employing dynamic scalability in which one or more buckets from a virtual machine node reaching a memory capacity threshold are transferred to another virtual machine node that is below its memory capacity threshold.

20 Claims, 5 Drawing Sheets

DISTRIBUTED DATA MANAGEMENT SYSTEM

CROSS REFERENCE TO RELATED APPLICATIONS

This application is a continuation of U.S. patent application Ser. No. 11/431,500 entitled "Distributed Data Management System" and filed May 9, 2006, which claims priority to U.S. provisional application 60/703,678 filed Jul. 28, 2005 and entitled "Distributed Data Management System," both of which are hereby incorporated by reference.

FIELD OF THE INVENTION

The present invention to data management and, in particular, to managing data in a multicomputer environment to provide dynamic scalability while simultaneously providing concurrent, non-blocking access to data.

BACKGROUND AND SUMMARY OF THE INVENTION

In the field of data management, maximizing both scalability and performance at the same time is a challenging problem. Scalability and performance are often conflicting objectives because improvements in one typically come at the expense of the other. In a multicomputer environment, where processes are physically distributed, the problem is exacerbated by network latency and communication bandwidth between nodes. The problem is even more daunting if nodes must join the distributed system in an ad-hoc fashion without service interruption.

Prior solutions provide high scalability at the expense of low performance or vice versa. Prior distributed data management systems, for example, though highly scalable, are designed to maintain invariance over several data objects at once and are thus encumbered by the need for transactional scope management and by the need for distributed global locking.

In particular, Database Management Systems (DBMs) guarantee that data modifications are strictly serializable and thus require expensive transaction management overhead and distributed locking to insure data correctness. The need for such transaction overhead and locking greatly reduces concurrent data access and limits performance Prior Scalable Distributed Data Structures (SDDS) solutions offer dynamic data scalability in a multicomputer environment, but encounter vexing performance problems that limit operational utility. Like distributed DBMS solutions, existing SDDS solutions inevitably encounter performance bottlenecks when accessed by a plurality of concurrent users. Though SDDS solutions can load balance data uniformly across multiple computer nodes, access to data on a particular node can be blocked undesirably by concurrent requests.

SDDS solutions also encounter performance limitations when managing data with complex shapes or of large size. Data sets composed of complex relationships form deep object graphs that incur expensive serialization costs. Compared to primitive data types, the computational cost of serializing and deserializing a complex object graph is significant. As a step in the process of data transfer, the impact of slow serialization on overall performance can be profound.

Moreover, prior SDDS solutions virtualize data access by resolving client requests from server nodes that contain actual data. If a requested object is managed by a server node that is different from the client node, a network data transfer must occur to move the object from the server node to the client node. Because large objects consume significant network bandwidth and result in undesirable transfer latency, SDDS solutions inevitably encounter performance bottlenecks because they must repeatedly drag large objects across the network for every remote request.

The present invention provides equivalent representations of complex data types that result in compressed byte arrays. These compressed data representations are stored and only reified back to their original format as needed. Accordingly, the invention provides data translation and passivation that not only reduce resource storage footprint but also speeds data transfer. The invention provides caching and synchronization of data sets without the expensive node-to-node data transfers that are commonly used. The invention provides scalable data structures, concurrency, efficient serialization and passivation, and data caching that enable applications to store and retrieve data in a manner that is optimal for use in a distributed environment where high speed service delivery and graceful scalability are critical.

In one implementation, the invention includes a distributed data management system with multiple virtual machine nodes operating on multiple computers that are in communication with each other over a computer network. Each virtual machine node includes at least one data store or "bucket" for receiving data. A digital hash map data structure is stored in a computer readable medium of at least one of the multiple computers to configure the multiple virtual machine nodes and buckets to provide concurrent, non-blocking access to data in the buckets, the digital hash map data structure including a mapping between the virtual machine nodes and the buckets. The distributed data management system employing dynamic scalability in which one or more buckets from a virtual machine node reaching a memory capacity threshold are transferred to another virtual machine node that is below its memory capacity threshold.

The present invention eliminates the need for the transaction management of conventional systems and maximizes concurrency through a distributed data structure that enables concurrent access to all data at all times, even as the data structure is growing. The disclosed invention overcomes this concurrency limitation with its non-blocking approach to data management while offering the dynamic scalability benefits of SDDS.

The challenge of creating a data management system that scales automatically to any size, enables concurrent user access, and guarantees high performance in a multicomputer environment is a daunting task. The method and system implemented herein solve the ubiquitous data management problem of high performance, concurrent access to data in a distributed environment, wherein the amount of data may grow dynamically and be modified at anytime.

Additional objects and advantages of the present invention will be apparent from the detailed description of the preferred embodiment thereof, which proceeds with reference to the accompanying drawings.

DETAILED DESCRIPTION OF PREFERRED EMBODIMENTS

Figure 1:
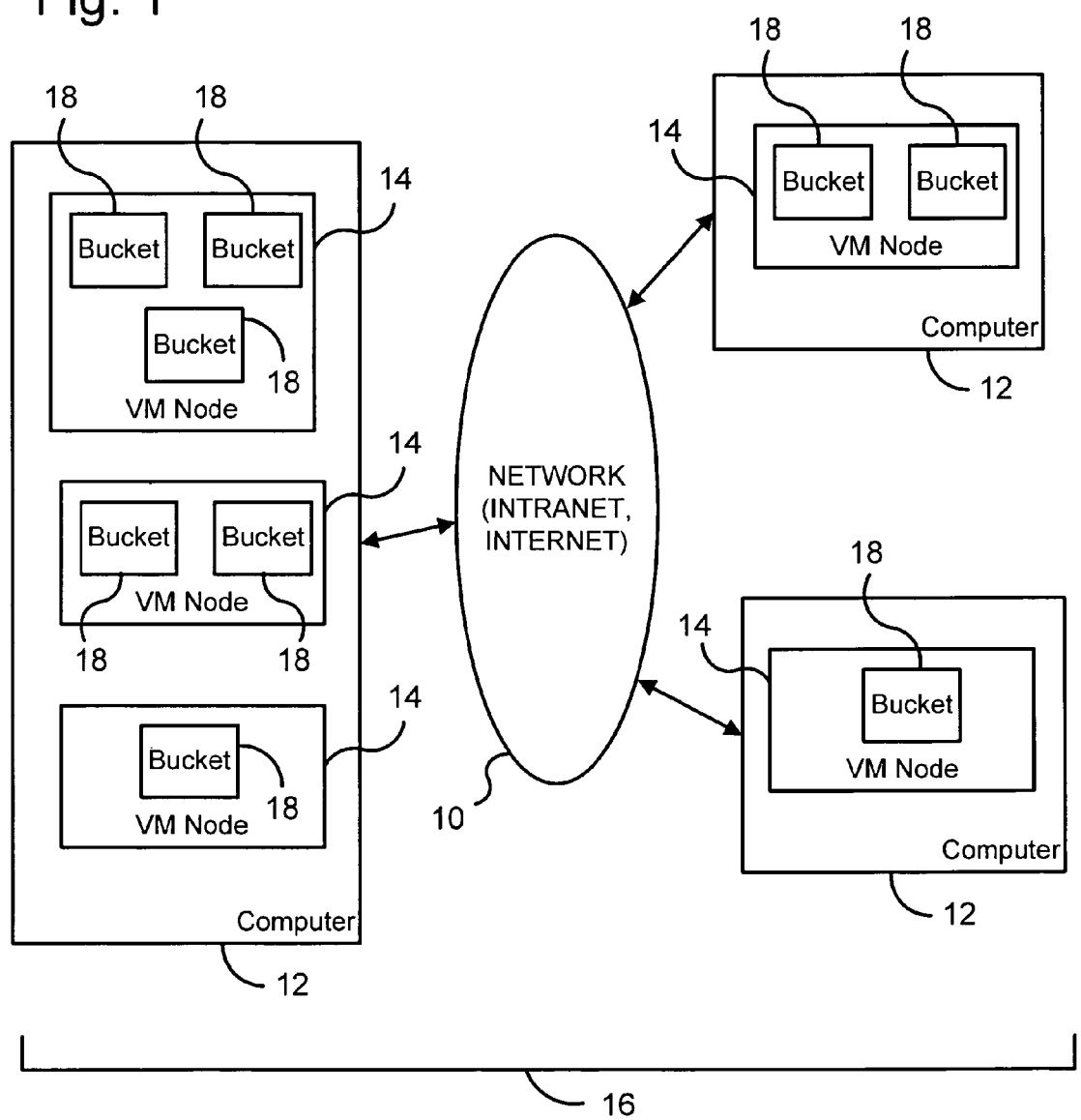
FIG. 1 is a block diagram illustrating a computer network as an operating environment of the present invention.

FIG. 1 is a block diagram illustrating a computer network 10 as an operating environment of the present invention. Computer network 10 includes multiple distinct computers 12 that are in network communication with each other. Each computer 12 operates at least one virtual machine (e.g., a Java virtual machine) as a node 14 of a distributed hash map data management system 16 of the present invention. Each virtual machine node 14 includes one or more logical stores or "buckets" 18 into which data entries data objects are stored.

Figure 2:
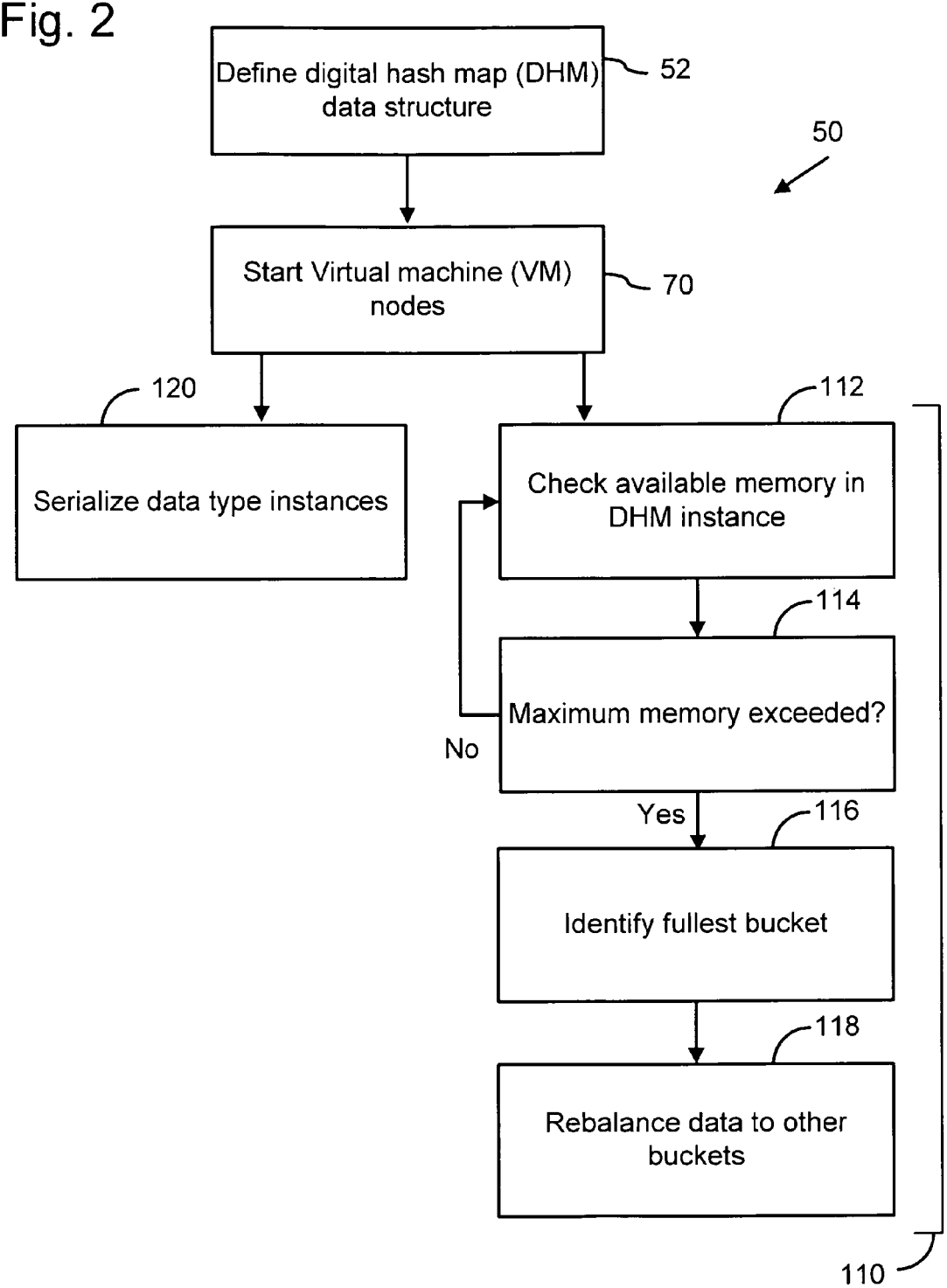
FIG. 2 is a flow diagram of a distributed data management method that provides highly scalable and highly concurrent distribution of data over multiple networked nodes.
Figure 3:
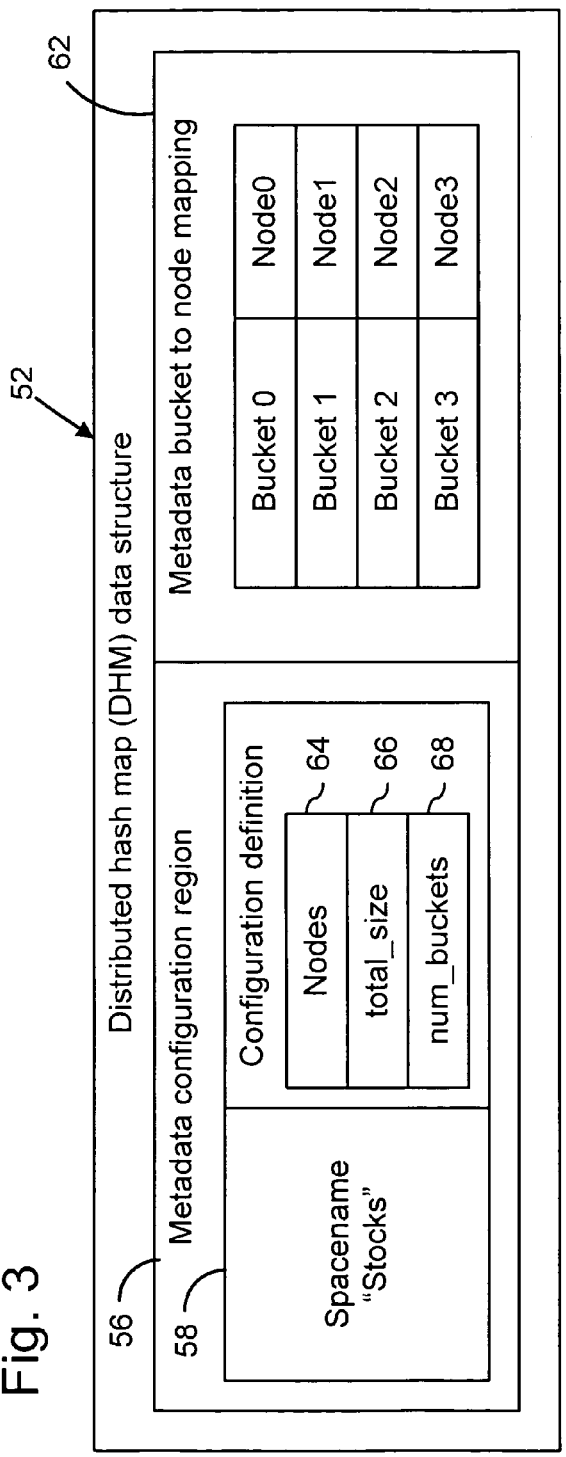
FIG. 3 is a block diagram of a distributed hash map data structure according to the present invention.

FIG. 2 is a flow diagram of a distributed data management method 50 that simultaneously provides highly scalable and highly concurrent distribution of data over multiple networked nodes 14. Distributed data management method 50 operating on computer network 10 is referred to as a distributed data management system 16 and is described with reference to a distributed hash map (DHM) data structure 52, which is illustrated in FIG. 3. Distributed hash map data management method 50 is implemented by computer execution of software stored in a computer readable medium.

In step 54 (FIG. 2) a distributed hash map (DHM) data structure 52 is defined for a class or type of data objects or elements (sometimes referred to as a class of data objects) with, for example, DHM.create ("stocks," properties). DHM data structure 52 (FIG. 3) includes a metadata configuration region 56 with a spacename field 58 (e.g., "Stocks" in the illustration of FIG. 3) and a configuration definition field 60. DHM distributed data structure 52 also includes a metadata bucket-to-node mapping field 62.

Configuration definition field 60 has a nodes subfield 64, a total_size subfield 66, and a num_buckets subfield 68. Nodes subfield 64 defines or sets the number of nodes 14 included for the class of data objects. Total_size subfield 66 sets the memory size of each logical bucket 18 at each node 14, and num_buckets subfield 68 sets the number of logical buckets 18 at each node 14. Metadata bucket-to-node mapping field 62 maps specific logical buckets 18 to specific nodes 14.

Figure 4:
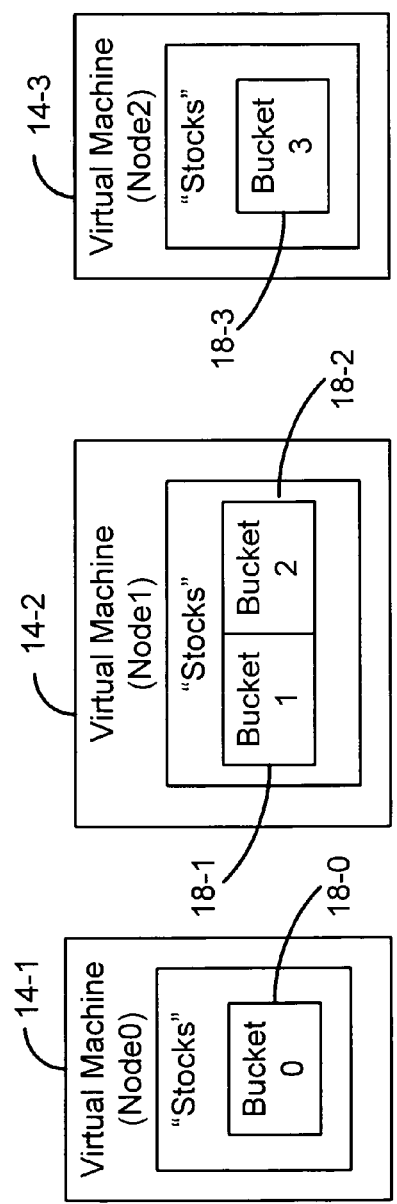
FIG. 4 is an illustration of virtual machine nodes with stores or "buckets" for storing a class of objects.

In step 70 virtual machine nodes 14 are started with their corresponding logical buckets 18 for data objects. FIG. 4 is an illustration of, for example, virtual machine nodes 14-1, 14-2, and 14-3, which are started for the "Stocks" class of data objects. Node 14-1 has bucket 18-0, node 14-2 has buckets 18-1 and 18-2, and node 14-3 has bucket 14-3.

In one implementation, distributed hash map data system 16 uses the java.util.Map application programming interface, which is available in the JAVA 2 Standard Edition development package. The java.util.Map application programming interface accepts two type variables, one for a key type and one for a value type, and maps keys to values such that a map cannot contain duplicate keys. Each key can map to at most one value.

Figure 5:
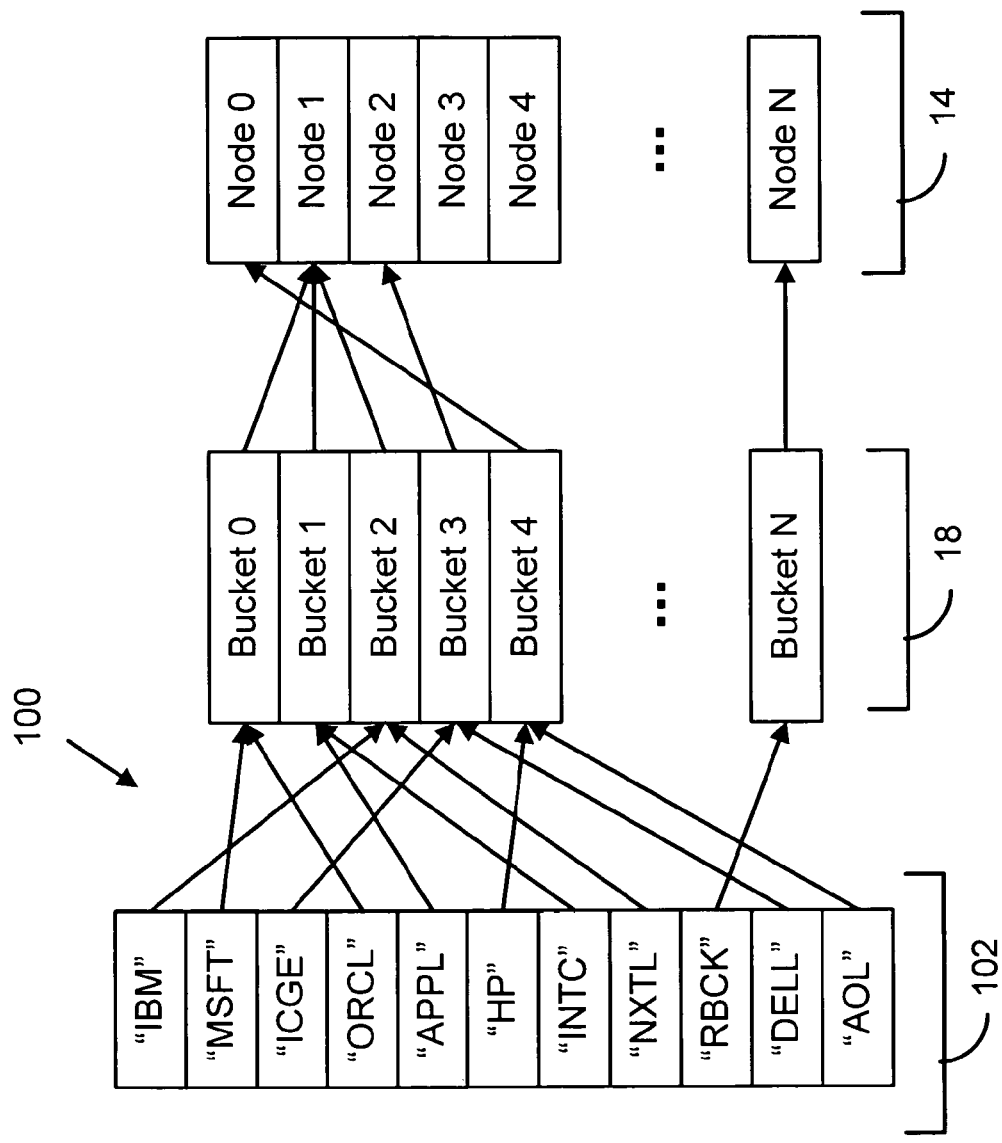
FIG. 5 is a diagrammatic illustration of a distributed hash mapping from map entries or keys to logical buckets, and a mapping from buckets to nodes.

FIG. 5 is a diagrammatic illustration of a distributed hash mapping 100 from map entries or keys 102 (e.g., stock names) to logical buckets 18, and a mapping 104 from buckets 18 to nodes 14. Distributed hash mapping 100 would be included in bucket-to-node mapping field 62 (FIG. 3), for example. In one implementation, a hash function such as a modulus function uniformly maps keys 102 among n-number of buckets 14 based on hash values.

Map entries or keys 102 are distributed across one or more distributed nodes 14 and, therefore, provide a transparent way to partition data across the nodes 14 in a dynamic fashion that maximizes the physical memory available for caching at any given moment. Individual processes participate as nodes in the management of a single logical DHM data structure 52 by providing real, physical memory for storing a subset of the overall content of the data structure. Such storage is referred to as a partition. All nodes providing partitions for the same DHM data structure 52 are members of the same underlying distributed data management system 16.

Only one node 14 is responsible for each map entry or key 102. In one implementation, for example, each data object physically resides on just a single host or "home" node 14 in a compressed byte array format, thereby maximizing the usage of available system-wide resources and the volume of data that can be cached in memory to improve performance. On lookup, a key's hash code determines the bucket identifier where the key's value is stored. Node location of the bucket 18 is readily accessed via system metadata structures, guaranteeing a cache entry is resolved in at most a single network hop.

Accordingly, DHM data structure 52 is a non-blocking distributed data structure in which all entries (key/value pairs) are distributed throughout a cluster of network-connected physical machine nodes 14. DHM data structure 52 provides a logical naming unit, or a user namespace. Because DHM entries live only within a single memory node 14 of the multicomputer environment 10, consistency management overhead can be dramatically reduced. Multiple DHM data structures 52 may be created within a single computer network 10. For example, DHM data structure 52 for "Stocks", "Currencies", "Sellers" and all their entries may be physically distributed across available machine resources in computer network 10. Thus, any system node 14 can contain entries for different DHM data structures 52. To add, search, and remove data, the system provides a simple, familiar interface that implements the java.util.Map API: put(key, value), get(key), delete(key), etc. The name of the DHM data structure 52 is scoped to the underlying distributed system specified by hostname and port number.

A logical DHM data structure 52 is identified by a unique name and accessed using a static factory method. The implementation internally synchronizes runtime metadata across all member nodes. A connection to the system is automatically established when a virtual machine process loads the class implementing the DHM data structure 52. Connections are gracefully shutdown during normal virtual machine shutdown. The implementation uses point-to-point communication between nodes 14 based on sockets. Applications can fine tune the transport layer through a variety of configuration options such as number of retries, retry wait time, TCP buffer sizes, etc. Each system node 14 monitors socket connections and does automatic cleanup when connections go away with minimal impact on application clients.

Each node 14 may be configured with a maximum memory threshold. Node memory management process 110 (FIG. 2) manages node memory and migrates data as node capacity approaches the threshold maximum. This process of dynamic data migration is referred to as rebalancing, which is managed by a virtual machine-wide rebalancing thread that is started lazily when a DHM instance is created.

The rebalancing thread periodically wakes up based on a configured sleep time and checks available memory (step 112). If any DHM instance in the virtual machine has exceeded the maximum memory (step 114), then a rebalancing operation is initiated. A rebalancing operation iterates over all distributed map instances, looking for the fullest bucket 18 in all DHM instances (step 116) and then sends a request to other member nodes 14 to accept data for rebalancing (step 118). Requests are first sent to nodes 14 managing the current DHM data structure 52, and then are sent to other nodes participating in separate DHM data structures 52.

The implementation provides a high level of concurrency by storing node level entries in concurrent data structures. During rebalancing (step 118), get operations are non-blocking, but put and replace operations on the bucket 18 being migrated are blocked until migration successfully completes. To minimize latency, application clients can optionally turn on local Least Recently Used (LRU) caching of entries in the DHM data structure 52. The local LRU caching provides very fast access rates when a small set of objects are more frequently accessed. The LRU cache is always kept synchronized with the underlying DHM.

Node memory management process 110 supports dynamic scalability of the DHM system. In order to manage dynamic growth, the system gracefully handle changes to the amount of system-wide free memory. For example, as more and more entries are hashed to a particular bucket 18, the free memory of the node 14 designated to host entries of the bucket 18 will eventually reach a fullness threshold. In this case, the system attempts to rebalance its load distribution among available nodes 14. Similarly, when a new node 14 joins the system, the system handles the new addition by offloading bucket entries lazily to this fresh node 14. Rebalancing logic is triggered when node allocation thresholds are encountered and when new nodes 14 join the system.

Actual rebalancing of occurs through bucket remapping of the Bucket2NodeRegion_<name> table whereby one node relinquishes management of one or more buckets 18 to another node 14. As a simple way of rebalancing, bucket remapping creates high load factor as follows. When a node's allocation threshold configured by the rebalance_threshold property is reached, the node requests a remap operation to initiate system wide load-balancing. The remap operation begins with the node first calculating the size s of its fullest bucket (or buckets). The node then engages its peers with a Bucket Remapping Protocol dramatized as follows . . .

Node0 (requester): "Hey, I'm filling up, does anybody have space to manage one of my buckets? I'd like to do this remap now to be proactive (and asynchronous)."

Node2 (responder): "I do, send the bucket entries my way, and I'll allocate them."

Node0: "Thanks, here they are."

Node2: "Great, I'm done allocating them . . . and I updated the globally accessible Bucket2NodeRegion_<name> Table that maps buckets to nodes."

Node0: "Thanks . . . now I'll remove my entries for the new bucket and forward any concurrent requests to you immediately."

Once a helper node 14 is found, buckets 18 are moved en masse to the rebalancing node 14 and the Bucket2NodeRegione_<name> table is updated accordingly. To maintain high concurrency, get operations are non-blocking throughout the duration of a bucket remapping operation. Modifications (put and remove), however, are postponed until the bucket remapping is complete.

As a common step in the process of sending an object graph from one node 18 to another, serialization is often a dominant factor in system performance. Therefore, to minimize performance bottlenecks when managing data with complex shape or large size, a serialization step 120 is implemented that compresses and canonicalizes all data type instances. Compared to stock Java serialization, this serialization step 120 significantly reduces the memory storage footprint as well as the transfer latency of complex data types. Even simple data types benefit from this serialization process 120. For example, a large two dimensional byte array consisting of java.lang.Integer objects can be reduced to roughly half the size of the original format.

Server nodes of the DHM store all data in byte array representations that are the result of serialization process 120, rather than as fully reified objects. This maximizes the available storage space. When a client makes a key request for a given object, the object's byte array is transported to the client node 18 and then transformed back into its connected graph of related objects.

Figure 6:
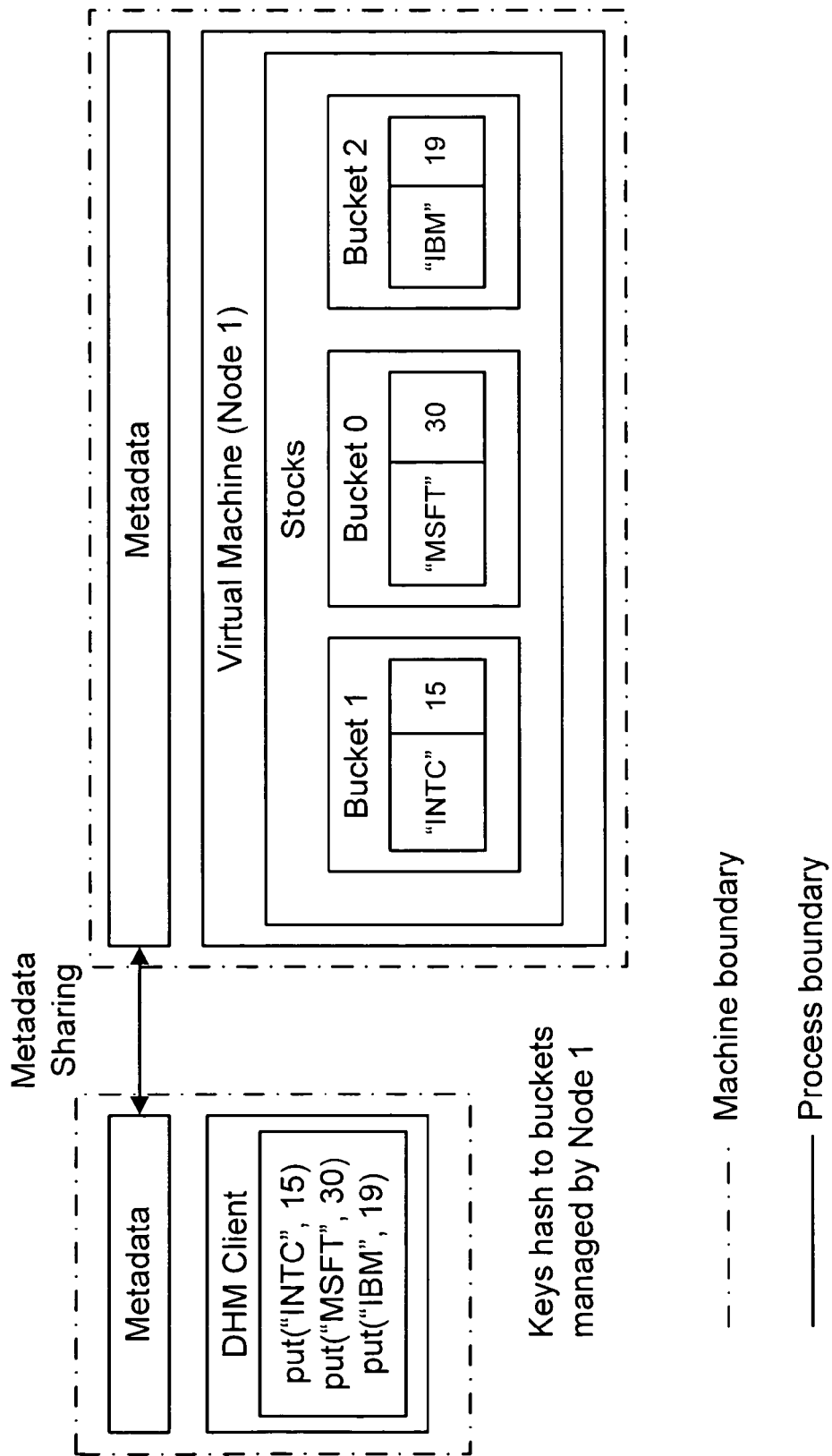
FIG. 6 illustrates put operations for storing entries in a remote node.

When data is put into the DHM data structure 52, the java.lang.Object#hashCode( ) for the entry's key is fed into a hashing algorithm resulting in a unique value that is based on a simple modulus function, as illustrated in FIGS. 5 and 6. The hash result is then mapped onto a virtual address space known as Bucket Space that is accordingly partitioned into buckets 18. Bucket space starts from the lowest hash value and ranges to the maximum hash value. Demarcations in bucket space define individual buckets 18. Every key is thus mapped to a unique bucket range. Because the hashing function creates a uniform distribution, population of bucket space similarly occurs in a uniform manner. Each bucket 18 is then mapped to a physical host node 14 through a Bucket2NodeRegion_<name>.

If a bucket 18 is free, that is, if it is not previously mapped, the DHM system 16 will automatically map the current node 14 (i.e., the node 14 where the put( ) is invoked) to the free bucket 18 so long as the node 14 is configured to manage buckets 18. If the current node 14 cannot accommodate the new bucket 18 with the entry value, peer nodes 14 will be sent a request to manage the bucket 18 along with the size of the entry value. If a peer node 14 can accommodate the new bucket 18, it will respond affirmatively to the current node 14 and the current node 14 will initiate a remote put operation to the "helper" node 14. If no helper node 14 is available for bucket management, then a DistributedHashMapException (RuntimeException) is thrown alerting the put( ) invoker that the DHM system 16 has reached its total capacity.

Assuming a bucket 18 and node 14 can be resolved to complete the put operation, the value of the submitted key is ultimately sent to the mapped hosting node 14 (found via the Bucket2NodeRegion_<name>), which binds the key into the node's private memory space. This memory space resides solely in the heap of a Java virtual machine in the form of a Map instance.

FIG. 6 also illustrates that put operations store entries in a remote node 14. On lookup, the result of the requested key's hashCode( )is applied to the DHM hash function. The matching bucket 18 that manages the key is then determined by the key's offset into the virtual Bucket Space. The bucket id is then used as a key into the globally accessible Bucket2NodeRegion_<name> table to locate the hosting node 14. The hosting node 14 is finally forwarded the lookup request and returns the stored value of the key. This arrangement insures at most one-hop network resolution.

To optimize lookup performance, Least Recently Used (LRU) caches are created on client nodes 14. A LRU cache holds a configurable number of entries or is based on a configurable memory size. When the entry limit or memory limit is exceeded, the least recently used entry is removed to accommodate any new entries. Contents in the LRU cache are kept synchronized with the underlying values stored in remote nodes 14 through a simple modification count mechanism (e.g., a vector timestamp). With each get( ) operation, the modification count of the cached value is sent to the remote node 14 where the real value of the key is managed. If the cached modification count is out of date, the remote node 14 sends the requester the updated value. If the cached modification count is still current, the remote node 14 only sends back a Boolean saying that the cached value is still valid and can thus be utilized. The design of this synchronization mechanism is suited for highly concurrent data where modifications to remote data are frequent and thus exploit lazy detection of invalid data. This is in contrast to conventional mechanisms that eagerly push invalidations and updates to remote clients.

Applications

Enterprise operators express the use case where memory bandwidth must be utilized as efficiently as possible. In particular, businesses cite the use case where they would like to cache huge volumes of data in distributed shared memory to avoid latency of database lookups, ultimately improving application scalability and performance while minimizing database licensing costs. By storing unique data on a single physical host, the method and system herein optimize the use of system-wide memory allowing multicomputer environment 10 to cache enormous volumes of data for complete database offload.

Furthermore, configurability of the system enables processes to be explicitly tuned. When a virtual machine node must preserve much of its working set memory for application server duties, the node can be configured as a read-only "client" to the system, only accessing data from peer "server" nodes while forgoing hosting of any DHM entries. In this way, the application server node can effectively preserve its heap for servicing client requests while delegating distributed caching responsibilities to a plethora of "overflow" nodes.

In the use case involving round-robin web servers or other load balancing schemes, the system can store stateful data in a distributed fashion, eliminating the constraints of session affinity and enabling randomized client access patterns.

Address space limitations on 32-bit operating systems limit the amount of addressable data in practice to less than 4 GB, and sometimes to less than 2 GB. With the disclosed system, a loaded machine with far more than 4 GB of RAM can be readily configured to host several DHM nodes that collectively cache well beyond 4 GBs of unique data.

Caching by nature targets read-mostly data and the disclosed system can significantly augment performance, scalability, and transparency in such scenarios. However, because the system is highly concurrent and deliberately unencumbered by consistency management duties, the system can also address use cases where data sets are rapidly changing. In stark contrast to the use case where data is read-only, the system can be used for managing real-time data. In other words, the system addresses the use case where separate lines-of-business must share volumes of "in-motion data". Such business use cases inevitably lead to the requirement for an ad-hoc enterprise-wide operational data store. This is precisely the role that the disclosed system can play.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and thereto.

I claim:

1. A method comprising:
storing, in a global data structure in at least one database management node of a plurality database management nodes of a distributed data management system, data entries mapping each logical data store of a plurality of logical data stores to a corresponding one of the database management nodes in which the logical data store is stored;
storing a data object in a first logical data store of the logical data stores, wherein the first logical data store corresponds to a key value of the data object, and wherein the first logical data store corresponds to a first database management node;
and upon adding a new database management node to the distributed data management system, performing rebalancing actions, the rebalancing actions comprising:
determining that the first data management node is a fullest node storing most data among the plurality database management nodes;
in response to the determining, sending requests from the first database management node to one or more of the database management nodes and the new database management node to determine whether anyone of the database management nodes and the new database management node has memory to accommodate the first logical data store;
receiving a reply by the first database management node and from the new database management node, the reply affirming that the new database management node has memory to accommodate the first logical data store;
migrating the first logical data store from the first database management node to the new database management node to rebalance memory consumption among the new database management node and the database management nodes; and
upon completion of the migrating, updating the data entries in the global data structure to map the first logical database to the new database management node, wherein, during performance of the rebalance actions, the data management system allows concurrent and non-blocking access to data objects stored in other logical data stores that are not involved in the migration and blocks access to the first logical data store.

2. The method of claim 1, wherein the global data structure is divided into partitions that are each stored in a different database management node.

3. The method of claim 1, further comprising hashing a received key value identifying the data object, wherein a resulting hash value identifies the logical data store in which the data object is stored.

4. The method of claim 1, wherein the first logical data store stores a data object and corresponds to a key value of the data object.

5. The method of claim 4, the updating the data entries comprising updating the data entries by the new database management node upon completion of the migrating.

6. The method of claim 1, the updating the data entries comprising updating the data entries by the first database management node upon completion of the migrating, including removing a mapping between the first logical data store and the first database management node.

7. The method of claim 6, further comprising, upon completion of the migrating, forwarding requests to the first data store from the first database management node to the new database management node.

8. A non-transitory computer-readable storage medium storing instructions that, when executed, cause a plurality of computers in communication with each other over a computer network to perform operations comprising:
    storing, in a global data structure in at least one database management node of a plurality database management nodes of a distributed data management system, data entries mapping each logical data store of plurality of logical data store to a corresponding one of the database management nodes in which the logical data store is stored;
    storing a data object in a first logical data store of the logical data stores, wherein the first logical data store corresponds to a key value of the data object, and wherein the first logical data store corresponds to a first database management node;
    and upon adding a new database management node to the distributed data management system, performing rebalancing actions, the rebalancing actions comprising:
    determining that the first data management node is a fullest node storing most data among the plurality database management nodes;
    in response to the determining, sending requests from the first database management node to one or more of the database management nodes and the new database management node to determine whether anyone of the database management nodes and the new database management node has memory to accommodate the first logical data store;
    receiving a reply by the first database management node and from the new database management node, the reply affirming that the new database management node has memory to accommodate the first logical data store;
    migrating the first logical data store from the first database management node to the new database management node to rebalance memory consumption among the new database management node and the database management nodes; and
    upon completion of the migrating, updating the data entries in the global data structure to map the first logical database to the new database management node, wherein, during performance of the rebalance actions, the data management system allows concurrent and non-blocking access to data objects stored in other logical data stores that are not involved in the migration and blocks access to the first logical data store.

9. The non-transitory computer-readable storage medium of claim 8, wherein the global data structure is configured to provide an identity of a database management node storing a logical data store in which the data object is stored upon receipt of a key value identifying a data object.

10. The non-transitory computer-readable storage medium of claim 8, the operations comprising hashing a received key value identifying a data object, wherein a resulting hash value identifies a logical data store in which the data object is stored.

11. The non-transitory computer-readable storage medium of claim 8, wherein the at least one of the database management nodes maintaining the global data structure further maintains a cache comprising recently accessed data objects.

12. The non-transitory computer-readable storage medium of claim 11, the operations further comprising, upon receiving a request for a value of a data object that is stored in the cache, transmitting the value to a database management node that stores a logical data store corresponding to the data object in order to confirm that the value of the data object stored in the cache is current.

13. The non-transitory computer-readable storage medium of claim 8, the updating the data entries comprising:
    updating the data entries by the new database management node upon completion of the migrating; and
    updating the data entries by the first database management node upon completion of the migrating, including removing a mapping between the first logical data store and the first database management node.

14. The non-transitory computer-readable storage medium of claim 8, wherein the first logical data store stores a data object and corresponds to a key value of the data object.

15. A distributed data management system comprising:
    a plurality of computers, each computer including a memory and in communication with each other over a computer network; and
    a non-transitory computer-readable storage medium storing instructions that, when executed, cause the computers to perform operations comprising:
    storing, in a global data structure in at least one database management node of a plurality database management nodes of a distributed data management system, data entries mapping each logical data store of a plurality of logical data stores to a corresponding one of the database management nodes in which the logical data store is stored;
    storing a data object in a first logical data store of the logical data stores, wherein the first logical data store corresponds to a key value of the data object, and wherein the first logical data store corresponds to a first database management node;
    and upon adding a new database management node to the distributed data management system, performing rebalancing actions, the rebalancing actions comprising:
    determining that the first data management node is a fullest node storing most data among the plurality database management nodes;
    in response to the determining, sending requests from the first database management node to one or more of the database management nodes and the new database management node to determine whether anyone of the database management nodes and the new database management node has memory to accommodate the first logical data store;
    receiving a reply by the first database management node and from the new database management node, the reply affirming that the new database management node has memory to accommodate the first logical data store;
    migrating the first logical data store from the first database management node to the new database management node to rebalance memory consumption among the new database management node and the database management nodes; and
    upon completion of the migrating, updating the data entries in the global data structure to map the first logical database to the new database management node, wherein, during performance of the rebalance actions, the data management system allows concurrent and non-blocking access to data objects stored in other logical data stores that are not involved in the migration and blocks access to the first logical data store.

16. The distributed data management system of claim 15, wherein the global data structure is divided into partitions that are each stored in a different database management node.

17. The distributed data management system of claim 15, the operations comprising hashing a received key value identifying the data object, wherein a resulting hash value identifies the first logical data store in which the data object is stored.

18. The distributed data management system of claim 15, wherein the at least one of the database management nodes storing the global data structure further maintains a cache comprising recently accessed data objects.

19. The distributed data management system of claim 18, the operations comprising, upon receiving a request for a value of a data object that is stored in the cache, transmitting the value to a database management node that stores a logical data store corresponding to the data object in order to confirm that the value of the data object stored in the cache is current.

20. The distributed data management system of claim 15, wherein the first logical data store stores a data object and corresponds to a key value of the data object.

* * * * *

UNITED STATES PATENT AND TRADEMARK OFFICE
CERTIFICATE OF CORRECTION

PATENT NO. : 9,122,713 B2
APPLICATION NO. : 13/959748
DATED : September 1, 2015
INVENTOR(S) : Russell Okamoto Page 1 of 1

It is certified that error appears in the above-identified patent and that said Letters Patent is hereby corrected as shown below:

In The Claims

Column 9, Line 21: In claim 8, delete "store" and insert -- stores --, therefor.

Signed and Sealed this
Twenty-third Day of February, 2016

Michelle K. Lee
*Director of the United States Patent and Trademark Office*